UNITED STATES PATENT OFFICE.

HERMANN ENDEMANN, OF BROOKLYN, ASSIGNOR TO THE AMERICAN CARBONATE COMPANY, OF NEW YORK, N. Y.

PROCESS OF MAKING LIGHT MAGNESIUM CARBONATE.

SPECIFICATION forming part of Letters Patent No. 534,212, dated February 12, 1895.

Application filed October 14, 1893. Serial No. 488,158. (No specimens.)

*To all whom it may concern:*

Be it known that I, HERMANN ENDEMANN, a citizen of the United States, residing at Brooklyn, in the county of Kings and State of New York, have invented new and useful Improvements in Processes of Manufacturing Light Carbonate of Magnesia, of which the following is a specification.

The principal object of my invention is to produce light carbonate of magnesia known in chemical language as "hydrated basic carbonate of magnesia" in an economical manner.

In carrying out my invention I take twenty parts by weight of magnesia, mix the same with five hundred parts of water and then I I add to the mixture twenty parts of carbonate of ammonia and agitate for about one hour. Into this mixture I introduce an additional quantity of carbonate of ammonia, so that the carbonic acid contained in this additional quantity of carbonate of ammonia together with the carbonic acid contained in the first quantity of carbonate of ammonia added to the magnesia as above stated, will be sufficient to form with the magnesia present a compound which contains about three molecules of carbonic acid ($3CO_2$) for about four molecules of magnesia ($4MgO$). In order to obtain this result, I use in all about thirty parts of commercial carbonate of ammonia, of which twenty parts are added to the mixture of water and magnesia at once and after having agitated the mass for about one hour, the additional ten parts of carbonate of ammonia are added and the agitation is continued for about one hour more. During this operation the mass becomes somewhat thick and it is then allowed to rest for some hours, when the same will solidify to moist but solid cake. When this cake is broken up, brought on a filter and washed with water, the carbonate of magnesia remains on the filter, while the bulk of the ammonia remains in solution in the water and filters off. The carbonate of magnesia is then permitted to dry. It shrinks but little, adheres well and is obtained in the shape of a very light cake. The ammonia which is contained in the solution passing off from the filter, and also such ammonia which may be contained in the carbonate of magnesia before the same is dried, can be readily reconverted into carbonate of ammonia by any of the well known methods, to be used in a subsequent operation. When the cake obtained from the mixture of magnesia, water and carbonate of ammonia is not crushed and filtered, but simply washed with water for the purpose of removing the ammonia, and then dried, the carbonate of magnesia is still lighter than that resulting from the crushed cake treated as above in the foregoing example.

Instead of breaking up and washing the cake which results from the action of the carbonate of ammonia upon magnesia as above described, the ammonia can be expelled by exposing the cake to a temperature of 60° centigrade in a partial vacuum, and in either case the ammonia is collected and reconverted into carbonate by any of the known methods.

Instead of mixing the magnesia with water and adding thereto the carbonate of ammonia as above described, I can take a solution of carbonate of ammonia in water and add to this the requisite quantity of magnesia, the proportion of magnesia being such that four molecules of magnesia ($4MgO$) are added to about three molecules of carbonic acid ($3CO_2$) contained in the solution.

In all cases the quantity of ammonium carbonate employed in proportion to the magnesia to be acted upon is such that a basic carbonate of magnesia is produced as represented by the following formulas:

$$3MgO2CO_2 + xH_2O$$
$$4MgO3CO_2 + xH_2O$$
$$5MgO4CO_2 + xH_2O$$

I am aware that hydrated carbonate of magnesia has been produced by exposing magnesia to the action of carbonate of ammonia and I do not broadly claim as my invention the treatment of magnesia with carbonate of ammonia.

What I claim as new, and desire to secure by Letters Patent, is—

1. The within described process of manufacturing light carbonate of magnesia which process consists in mixing magnesia with carbonate of ammonia and water in about the proportion of twenty parts of magnesia, thirty parts of carbonate of ammonia and five hundred parts of water, exposing the mixture to agitation and finally separating the light carbonate of magnesia formed from the other products of the reaction substantially as described.

2. The within described process of manufacturing light carbonate of magnesia which process consists in mixing magnesia with carbonate of ammonia and water, exposing the mixture to agitation, then permitting it to harden into a cake, and finally expelling the ammonia by exposing the cake to a temperature of about 60° centigrade in a partial vacuum substantially as described.

In testimony whereof I have hereunto set my hand in the presence of two subscribing witnesses.

HERMANN ENDEMANN.

Witnesses:
WM. C. HAUFF,
M. HAUFF.